United States Patent [19]

Mizutani

[11] Patent Number: 4,582,144

[45] Date of Patent: Apr. 15, 1986

[54] PERCUSSIVE TOOLS

[75] Inventor: Makoto Mizutani, Anjo, Japan

[73] Assignee: Makita Electric Works, Ltd., Aichi, Japan

[21] Appl. No.: 726,240

[22] Filed: Apr. 23, 1985

[30] Foreign Application Priority Data

| | | | |
|---|---|---|---|
| Apr. 25, 1984 | [JP] | Japan | 59-84758 |
| Dec. 24, 1984 | [JP] | Japan | 59-197768[U] |
| Dec. 26, 1984 | [JP] | Japan | 59-200259[U] |

[51] Int. Cl.[4] ............ B23B 45/02

[52] U.S. Cl. ............ 173/14; 173/116; 173/117; 173/119; 92/85 B

[58] Field of Search ............ 173/117, 118, 14, 104, 173/116, 119–121, 123; 92/85 B

[56] References Cited

U.S. PATENT DOCUMENTS

| | | | |
|---|---|---|---|
| 4,290,492 | 9/1981 | Sides et al. | 173/118 |
| 4,310,055 | 1/1982 | Wanner et al. | 173/118 |
| 4,325,436 | 4/1982 | Richter et al. | 173/118 X |

*Primary Examiner*—E. R. Kazenske
*Assistant Examiner*—John L. Knoble
*Attorney, Agent, or Firm*—Dennison, Meserole, Pollack & Scheiner

[57] ABSTRACT

Disclosed herein is a percussive tool having a piston and a ram slidably mounted within a cylinder which is axially displaceable. An air chamber is defined in front of the ram, and the cylinder has exhaust openings formed therein. With the cylinder in its retracted position, the exhaust openings communicate with the front air chamber so that the air cushion therein is vented during forward movement of the ram, and with the cylinder in its advanced position, the exhaust openings are closed to seal the air chamber so that the ram is limited in its rearward movements.

5 Claims, 14 Drawing Figures

PERCUSSIVE TOOLS

BACKGROUND OF THE INVENTION

1. Field of the Invention

This invention relates to percussive tools such as hammer drills and pneumatic hammers, and more particularly to a percussive tool incorporating a mechanism for protecting the structure of the tool against idle percussive action during no load operation.

2. Description of the Prior Art

In some forms of percussive tool, hammer blows are imparted to a tool bit by a striker reciprocated by a piston through an air cushion formed between the striker and the piston. When the tool is operated with a bit positioned in the operating position, the energy of an impact may be absorbed by the material being acted on. However, during idle percussive action in which the bit is lifted from the material, or when the bit is not mounted to the tool, the striker will strike a blow upon associated retaining members. The prior art discloses a variety of devices for absorbing the energy of an impact of the striker, thereby preventing any possible damage to the tool body.

One such prior art system has employed buffer members such as springs and rubbers for absorbing the impact energy of the striker acting on the retaining members. In tools having a relatively great impact energy, however, such intensive impact energy may be repeatedly and yet continuously applied to the retaining members, which will quite often cause damage to the retaining members. Also, the striker is likely to rebound due to the repulsive action of the buffer and hence, percussive action will be repeated, which will also cause serious damage to the structure of the tool.

U.S. Pat. No. 4,183,414 discloses a percussive tool in which a resilient retaining ring referred to as a catching collar is provided to absorb idle blows of the striker. However, it is found that the retaining ring is continually subject to shocks, and within a very short time the retaining ring will be exposed to considerable damage.

U.S. Pat. No. 3,921,729 discloses a pneumatic hammer in which a striking member driven by an air cushion produced in the bore in a cylinder, has a tapered surface which frictionally engages a tapered surface of a retainer ring, thereby limiting the striking member in its rearward movement and preventing idle blows of the striking member It is found, however, that the engagement between the two tapered surfaces is sometimes insecure. Such irregular engagement will cause the striking member to impart its impact energy to the tool and thus, the structure of the tool will be exposed considerable wear or severe damage. Also, the tapered surfaces may be strongly retained to the extent that they are hardly released from such retained position, thereby reducing the efficiency of operation.

SUMMARY OF THE INVENTION

It is, accordingly, an object of the present invention to eliminate the above disadvantages associated with the previously known percussive tools by providing a percussive tool including a novel system capable of preventing damage to the tool which may be caused by idle percussive action of the tool.

It is another object of the present invention to provide a novel percussive tool which may reduce impacts and vibrations produced by idle percussive action of the tool.

It is a further object of the present invention to provide a novel percussive tool which is simple in construction and which facilitates tool bit removal and replacement.

According to the present invention, there is provided a percussive tool comprising a crank housing, crank means encased in the crank housing, a substantially cylindrical barrel disposed generally forwardly of the crank means, a cylinder positioned within and axially displaceable through the barrel, a piston operatively connected to the crank means and mounted within and axially displaceable through the rearward end of the cylinder, ram means mounted within the cylinder and axially displaceable in front of the piston for imparting percussive action to a bit positioned in its operating position, a front and a rear air chamber formed in front of and behind the ram means for maintaining an air cushion to drive the ram means, a spring positioned between the barrel and the cylinder for normally urging the latter in the direction of rearward movement of the piston, and a pair of diametrically opposed exhaust openings formed in the cylinder. The location of the exhaust openings is such that with the cylinder in its retracted position, the exhaust openings communicate with the front air chamber so that the air cushion therein is vented during forward movement of the ram means, and with the cylinder in its advanced position, the exhaust openings are closed to seal the front air chamber so that the ram means is limited in its rearward movements.

The present invention will become more fully apparent from the claims and description as it proceeds in connection with the drawings.

DETAILED DESCRIPTION OF THE PREFERRED EMBODIMENTS

Figure 1:
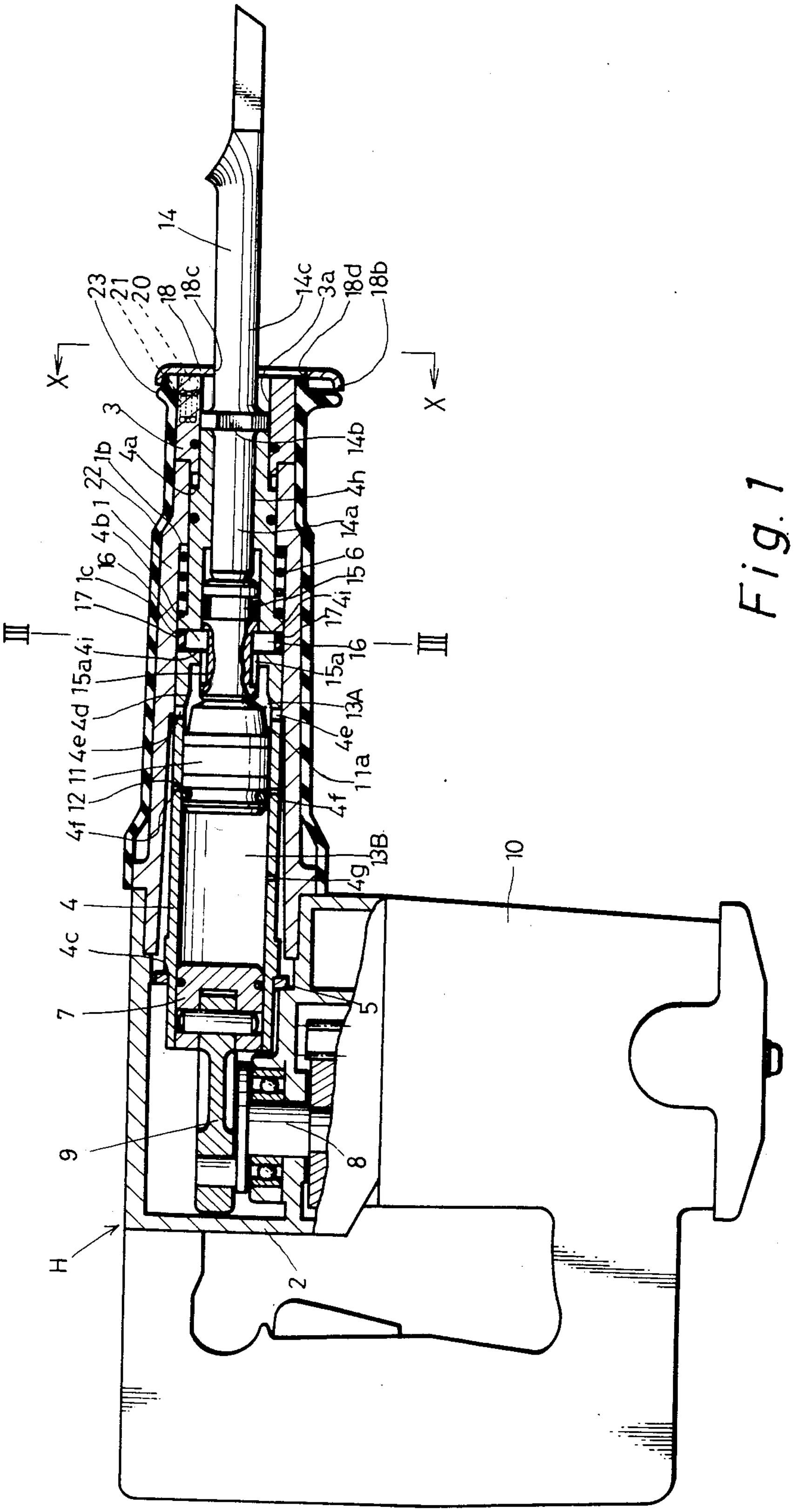
FIG. 1 is a side view, partly in cross section, of a percussive tool according to a first embodiment of the invention.

Referring to the drawings and to FIG. 1 in particular shown therein and generally designated by the alphabet H, is a percussive tool constructed in accordance with a first embodiment of the invention. As shown therein, the percussive tool H includes a horizontally disposed cylindrical barrel 1, a crank housing 2, and a head 3. The head 3 has formed therein an axial bore 3*a* of hexagonal cross-sectional configuration for receiving a complimentary hexagonal flange portion 14*b* of a tool bit 14.

The barrel 1 encloses a cylinder 4 which is axially movable therewithin, the forward portion of the cylinder 4 being received in the forward portion of the barrel 1 and the axial bore 3*a* of the head 3. The cylinder 4 has a first stepped portion 4*a* formed adjacent the forward end thereof, a second stepped portion 4*b* formed on the medial portion thereof and a third stepped portion 4*c* formed adjacent the rearward end thereof. A retainer ring 5 is provided on the upper end of the crank housing 2 which is adapted to abut against the third stepped portion of the cylinder 4. Thus, the forward movement of the cylinder 4 is restricted by engagement of the first stepped portion 4*a* with the head 3; and the rearward movement of the cylinder 4 is restricted by engagement of the third stepped portion 4*c* with the retainer ring 5. The cylinder 4 is also formed with a conical retaining surface 4*d* on the inner periphery of the medial portion thereof. The cylinder 4 further has formed therein a pair of exhaust openings 4*e* disposed rearwardly of the retaining surface 4*d* and adapted to communicate the interior of the cylinder 4 with the atmosphere when the cylinder 4 is in its most rearward position; a pair of percussive openings 4*f* which are of reduced diameter as compared with that of the exhaust openings 4*e*; and an air supply opening 4*g*, these openings 4*e*, 4*f* and 4*g* being arranged in this order from the forward end of the cylinder 4.

A spring 6 is positioned between the second stepped portion 4*b* of the cylinder 4 and the stepped portion 1*b* of the barrel 1 and adapted to normally urge the cylinder 4 in its most rearward position.

Slidably received within the rearward bore of the cylinder 4 is a piston 7 which is connected to a crank 8 turnable by a motor 10 through a connecting rod 9.

Positioned forwardly of the piston 7 and mounted axially slidably within the bore of the cylinder 4 is a first ram 11 which has at the forward end thereof a conical engaging surface 11*a* engageable with the retaining surface 4*d* on the cylinder 4. The rear end of the ram 11 has a seal 12 which seals against the bore of the cylinder 4. In the hammer mode of the tool, when the ram 11 is in its most rearward position (the postion shown in FIG. 1) the seal 12 of the ram 11 is past the percussive openings 4*f* in the cylinder 4, and therefore a closed air chamber 13B is defined behind the ram 11. Also, as generally indicated at 13A an air chamber is defined in front of the ram 11 which communicates with the exhaust openings 4*e* in the cylinder 4. Thus, when the piston 7 is advanced from the position shown in FIG. 1, an air cushion is formed in the rear air chamber 13 which serves to push the ram 11 forwardly. Conversely, when the piston 7 is retracted, the entrapped air in the air chamber 13A is decompressed with the result that the ram 11 will be retracted substantially in coincidence with the rearward movement of the piston 7.

Figure 2:
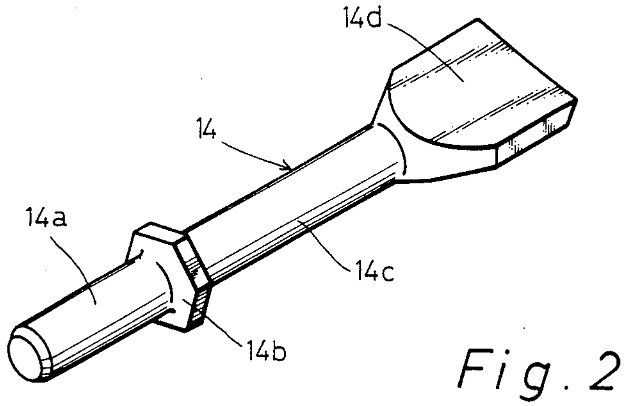
FIG. 2 is a perspective view showing a tool bit for use in the percussive tool of FIG. 1.

A bit 14 is inserted generally in the forward end of the cylinder 4. The bit 14 has a specific configuration adapted for use in the percussive tool of the invention, as shown in FIG. 2. The bit 14 has a shank portion 14*a* slidably received in a complimentary socket bore 4*h* formed in the forward end of the cylinder 4, and an integral hexagonal flange portion 14*b* slidably received in the complimentary hexagonal axial bore 3*a* in the head 3. With this specific hexagonal configuration of both the axial bore 3*a* of the barrel 3 and the flange portion 14*b* of the bit 14, the blade portion 14*d*, particularly of a chisel formation (as shown in FIG. 2) or a hoe formation, may be held at a suitable angle commensurate with the operation being performed by merely changing the mounting position of the bit. Thus, the efficiency of operation may be enhanced. Specifically, the function of the flange portion 14*b* of the bit 14 is two-fold. First, the hexagonal flange portion 14*b* is effective to prevent the bit 14 against rotation. Second, it is effective to prevent the bit 14 against withdrawal in association with a locking plate 18 which will be hereinafter described in greater detail.

Axially slidably mounted within the cylinder 4 between the first ram 11 and the bit 14 is a second ram 15 which serves to transmit the reciprocating movement of the first ram 11 to the bit 14. The second ram 15 has formed on its outer periphery a pair of axially extending keyways 15*a* for receiving a pair of keys 16 retained in a pair of diametrically opposed fitting openings 4*i* formed in the cylinder 4. Thus, the keyways 15*a* act to limit the second ram 15 in its reciprocating movements.

Figure 3:
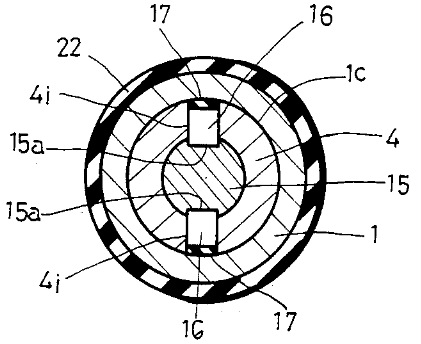
FIG. 3 is a cross-sectional view, on somewhat an enlarged scale, taken along the line III—III of FIG. 1.

As best shown in FIG. 3, a pair of protective members 17 are secured to the outer end surfaces of the keys 16, respectively, and adapted to protect the inner periphery 1*c* of the barrel 1 against damage which may be otherwise caused by sliding movement of the keys 16. The protective members 16 are formed of resilient material, each being located within the fitting opening 4*i* of the cylinder 4 such that it contacts the inner periphery 1*c* of the barrel 1. Thus, when the cylinder 4 is axially moved, the protective members 17 are slid along the inner periphery 1*c* of the barrel 1 with the result that the latter may be effectively protected against damage.

Figure 4:
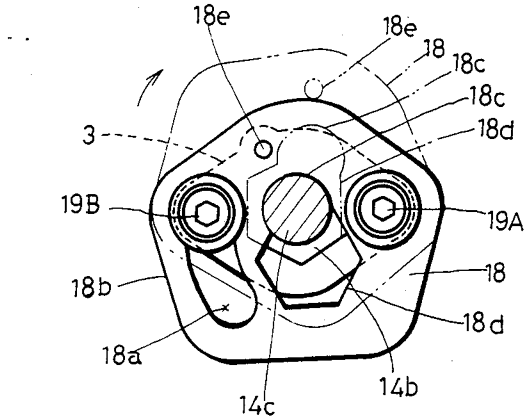
FIG. 4 is a view, on somewhat an enlarged scale, taken in the direction of the arrows X in FIG. 1.

Mounted to the forward end of the head 3 is a locking plate 18 for locking the bit 14 in its operating position in the tool. Specifically, as best shown in FIG. 4, the locking plate 18 is supported from the head 3 by a pair of bolts 19A and 19B extending through an opening (not shown) and an arcuately elongated slot 18*a* in the locking plate 18, respectively. The peripheral edge 18*b* of the plate 18 is bent rearwardly to enclose the front edge portion of the head 3. The locking plate 18 is provided with a central opening 18*c* for slidably receiving the body portion 14*c* of the bit 14 therethrough; and a partially cut out hexagonal opening 18*d* for receiving the flange portion 14*b* of the bit 14 therethrough, with the locking plate 18 pivotted upwardly as shown in phantom line in FIG. 4. In the upper rear surface, the locking plate 18 is formed with a recess 18*e* which is engageable with a spherical piece 20 positioned in the head 3 and biased forwardly by a spring 21. Thus, when the spherical piece 20 is engaged with the recess 18*e*, the locking plate 18 is retained in a position in which the body portion 14*c* of the bit 14 is securely fitted in the central opening 18*c* of the locking plate 18. Thus, when the locking plate 18 is retained in its locked position, the bit 14 may be effectively prevented from being withdrawn.

A cylindrical cover member 22 of resilient material is provided which encloses both the barrel 1 and the head 3. The forward end of the cover member 22 has integrally formed a buffer projection 23 projecting circumferentially outwardly therefrom for damping external forces which may otherwise be delivered to the locking plate 18 during operation. To this end, the buffer projection 23 is disposed in confronting relation to the peripheral edge 18*b* of the locking plate 18, and has a contour substantially equal to that of the peripheral edge 18*b* of the locking plate 18.

The operation of the percussive tool H thus constructed will now be described with reference to FIG. 1 and FIGS. 5A to 5D.

First, in order to operate the tool in the normal hammer mode, the operator presses the bit 14 against a workpiece, thereby causing the second ram 15 and thence the first ram 11 to move rearwardly, the seal 12 of the first ram 11 being moved past the exhaust openings 4*f* in the cylinder 4, as may be seen in FIG. 1. With the above-described components in the position shown in FIG. 1, the piston 7 is reciprocated in the cylinder 4, and as this occurs, the air entrapped in the rear air chamber 13B is compressed and decompressed, thereby reciprocating the first ram 11 to cyclically impact the second ram 15. Those impacts are transferred by the second ram 15 to the bit 14.

Figure 5A:
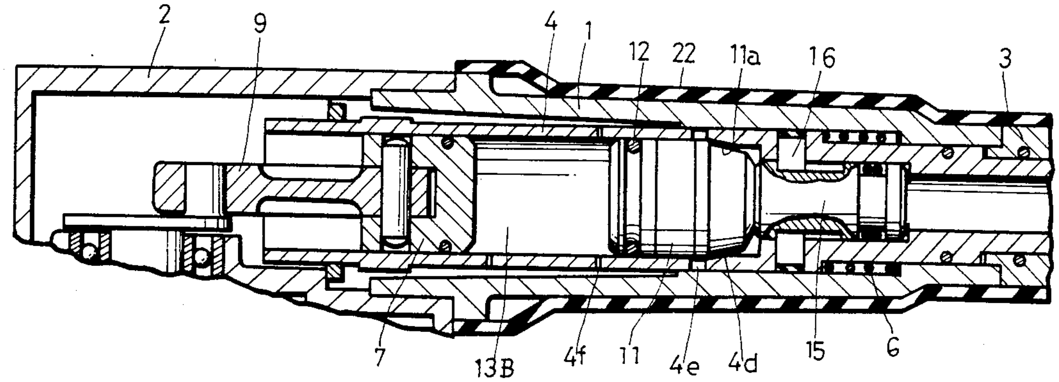
FIGS. 5A to 5D are fragmentary cross-sectional views of the percussive tool, illustrating the idle percussive action of the first ram in various positions.
Figure 5B:
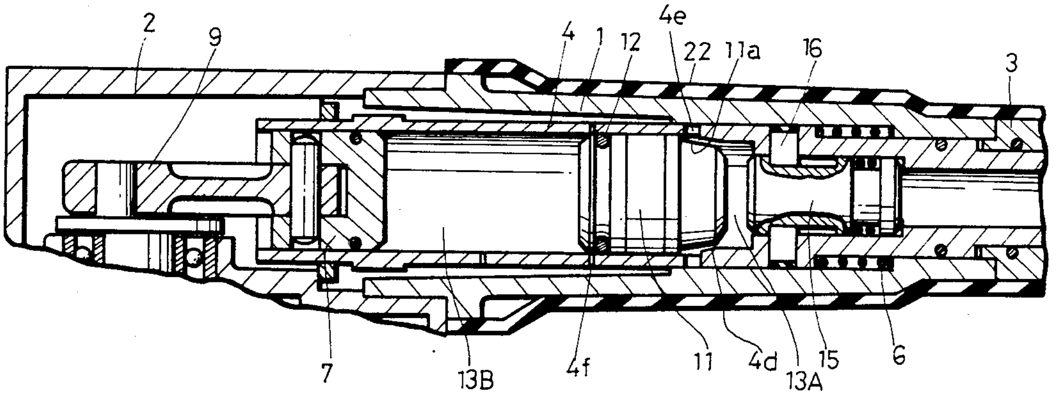

If now the operator uses the tool with no load, that is with the bit 14 lifted from the material or without inserting the bit 14 in the tool, the piston 7 is actuated so advancing the first ram 11 to its most forward position until the engaging surface 11*a* of the first ram 11 abuts on the retaining surface 4*d* of the cylinder 4 and at the same time, the second ram 15 is held in its most forward position. When in this position, the engaging surface 11*a* of the first ram 11 will be retained on the retaining surface 4*d* of the cylinder 4 so that the first ram 11 is held in its most forward position in which it is inoperative to strike idle blows upon the second ram 15 (FIG. 5A), or the engaging surface 11*d* will fail to engage the retaining surface 4*d*, thereby causing the first ram 11 to rebound from its most forward position (FIG. 5B).

Figure 5C:
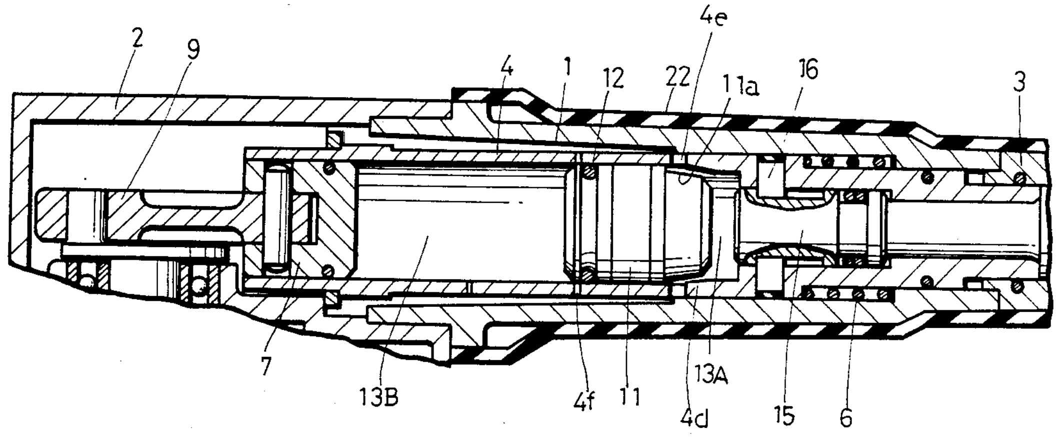

If the first ram 11 rebounds rearwardly, the cylinder 4 will be pressed by the action of the first ram 11 and moved forwardly in opposition to the action of the spring 6, thereby covering the exhaust openings 4*e*. As this occurs, the front air chamber 13A is closed and by means of the back pressure formed in the front air chamber 13A, a suction effect will be imparted to the first ram 11, thereby limiting the first ram 11 in its rearward movement such that the seal 12 of the first ram 11 is not past the percussive openings 4*f* in the cylinder 4. As soon as this occurs, the cylinder 4 will be released from its stressed position and moved rearwardly under the action of the spring 6 (FIG. 5C).

Figure 5D:
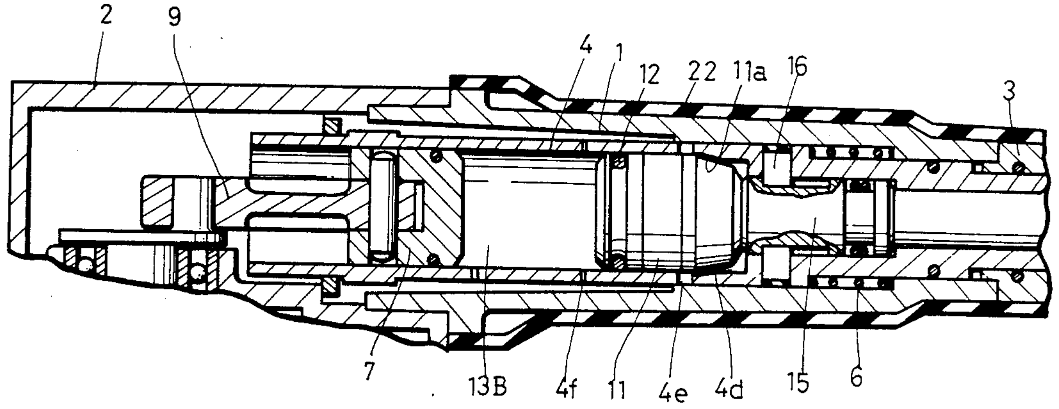

When in this position, even if the piston 7 is actuated to reciprocate the first ram 11, the forward travel of the ram 11 will be limited, since the rear air chamber 13B communicates with the atmosphere through the percussive openings 4*f* and the air pressure in the chamber 13B is reduced. At this time, the pressing energy of the first ram 11 will be damped as it is transmitted to the spring 6 through the cylinder 4 (FIG. 5D).

Thus, even if the first ram 11 rebounds rearwardly, the resultant idle percussive action of the first ram 11 may effectively be damped, thereby restraining impacts to be imparted to the cylinder 4 and/or the barrel 1.

From the foregoing description, it will be appreciated that the invention offers the possibility of positively protecting the structure of the tool H against idle percussive action of the first ram 11, thereby precluding possible damage to the cylinder 4 and/or the barrel 1 and increasing durability of the tool.

Also, the provision of the protective members 17 is an important feature of the invention. As has been mentioned, if the first ram 11 is driven with no load and the keys 16 are moved with the cylinder 4, the protective members 17 are slid along the inner periphery 1*c* of the barrel. Thus, the protective members 17 are effective to protect the inner periphery 1*c* of the barrel 1 against damage which may otherwise be caused by sliding movement of the keys 16, thereby eliminating the possibility of malfunction of the cylinder 4 due to such damage to the inner periphery 1*c* of the barrel. Further, the keys 16 are pressed radially inwardly by the protective members 17 and limited in their radial movements relative to the cylinder 4, they may be properly received in the keyways 15*a* of the second ram 15, thereby ensuring the accurate operation of the second ram 15 to strike a blow on the bit 14.

The provision of the buffer projection 23 is another feature of the invention. During operation, if debris or like material hits the locking plate 18, or conversely, if the locking plate 18 hits any other objects, the bit 14 may accidentally be released from its locked position, or the locking plate 18 itself may be distorted, which may impair the reciprocating movement of the bit 14, the bit removal and replacement, and the pivotal movement of the locking plate 18. The buffer projection 23 is effective to damp and absorb the above-described external forces which may be delivered to the locking plate 18.

Figure 6:
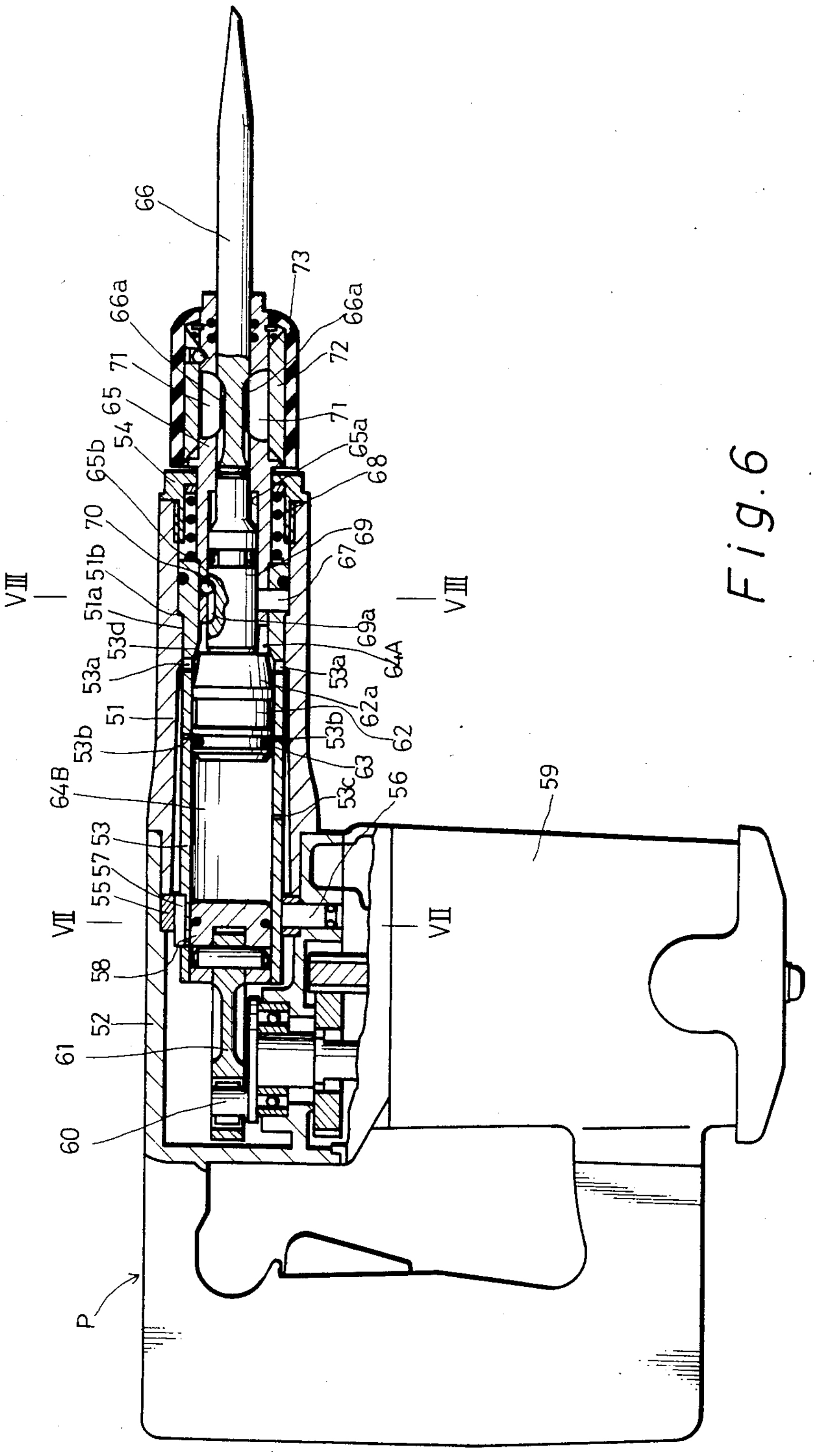
FIG. 6 is a side view, partly in cross section, of a percussive tool according to a second embodiment of the invention.
Figure 7:
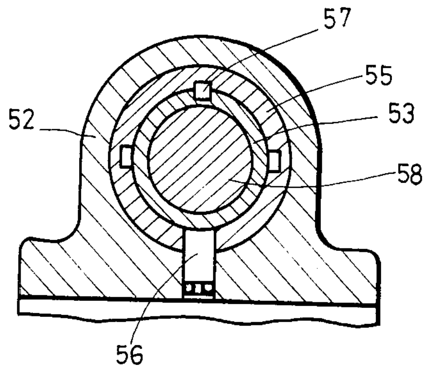
FIG. 7 is a cross-sectional view, on somewhat an enlarged scale, taken along the line VII—VII of FIG. 6.
Figure 8:
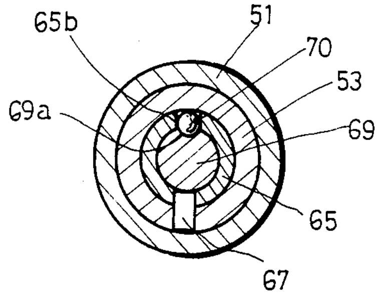
FIG. 8 is a cross-sectional view, on somewhat an enlarged scale, taken along the line VIII—VIII of FIG. 6.

Referring now to FIGS. 6 to 8, shown therein is a second embodiment of the present invention, substantially the same as that of FIG. 1 insofar as the barrel, the cylinder, the first ram and the second ram are concerned, but employing an individual bit holder for holding a tool bit.

In FIG. 6, a percussive tool P has a horizontally extending cylindrical barrel 51, a crank housing 52, and a cylinder 53. The barrel 51 has adjacent the forward end thereof a support surface 51*a* and a stepped portion 51*b* contiguous to the support surface 51*a*. The forward end of the barrel 51 has a head member 54 threadedly secured thereto for mounting a bit holder 65 which will be explained later. A lock ring 55 is provided adjacent the rear end of the barrel 51 and is secured to the crank housing 52 through a pin 56, as best shown in FIG. 7.

The cylinder 53 is concentrically disposed within the barrel 51, the forward end of the cylinder 53 being slidable along the support surface 51*a* and the rearward end of the cylinder 53 being slidable in the lock ring 55 through a key 57 which serves to limit the cylinder 53 in its rotational movement. The forward and rearward travels of the cylinder 53 are limited by the rear end of the head member 54 and the stepped portion 51*b* of the barrel 51, respectively. As with the first embodiment, the cylinder 53 has formed therein a pair of exhaust openings 53*a* adapted to communicate the interior of the cylinder 53 with the atmosphere, a pair of percussive openings 53*b* which are of reduced diameter as compared with that of the exhaust openings 53*a*, and an air supply opening 53*c*, these openings 53*a*, 53*b*, and 53*c* being arranged in this order from the forward end of the cylinder 53. Important to the invention, when the cylinder 53 is in its most rearward position, the exhaust openings 53*a* are communicated with the atmosphere and when the cylinder 53 is advanced, the exhaust openings 53*a* are covered by the support surface 51*a* of the barrel 51. The cylinder 53 also has a conical retaining surface 53*d* extending forwardly of the exhaust openings 53*a*.

Slidably received within the rearward bore of the cylinder 53 is a piston 58 which is connected to a crank 60 turnable by a motor 59 through a connecting rod 61.

Positioned forwardly of the piston 58 and mounted axially slidably within the bore of the cylinder 53 is a first ram 62 which has at the forward end thereof a conical engaging surface 62*a* engageable with the retaining surface 53*d* on the cylinder 53. The rear end of the ram 62 has a seal 63 which seals against the bore of the cylinder 53. With this arrangement, a front and a rear air chamber 64A and 64B corresponding to the front and rear chambers 13A and 13B of the first embodiment are formed in front of and behind the first ram 62. Thus, when the piston 58 is reciprocated, the air pressure in the respective air chambers 64A and 64B is varied, thereby reciprocating the first ram 62 substantially in coincidence with the reciprocating movement of the piston 58.

Connected to the forward end of the cylinder 53 through the head member 54 is a bit holder 65 for holding a tool bit 66. The shank portion of the bit 66 has a pair of keyways 66*a* by means of which the bit 66 may be positioned in its operating position in the bit holder 65. Specifically, the bit holder 65 has an axially extending stepped bore 65*a* and an opening 65*b* formed adjacent the rear end thereof. The bit holder 65 is connected to the cylinder 53 through a pin 67 inserted both in the forward end of the cylinder 53 and the rearward end of the bit holder 65 (FIG. 8).

A spring 68 is positioned around the bit holder 65 between the cylinder 53 and the head member 54 and adapted for normally urging the cylinder 53 in a direction of rearward movement of the piston 58.

Axially slidably mounted within the rear end of the axial bore 65*a* of the bit holder 65 between the first ram 62 and the bit 66 is a second ram 69 which serves to transmit the reciprocating movement of the first ram 62 to the bit 66. Specifically, the second ram 69 has an axially extending elongated engaging groove 69*a* adapted to receive an engaging ball 70 positioned in the opening 65*b* of the bit holder 65. Thus, the second ram 69 is axially individually movable within the length of the engaging groove 69*a*, and when in its most forward position shown in FIG. 6, the second ram 69 is movable substantially in cooperation with the bit holder 65 and the cylinder 53.

The bit holder 65 includes in the forward end thereof a pair of keys 71 adapted to engage the keyways 66*a* of the bit 66, respectively. A selector ring 72 is rotatably mounted to the forward end of the bit holder 65 for limiting and allowing the radial movement of the keys 71. A cover 73 is provided and positioned around the selector ring 72.

The operation of the percussive tool P of the second embodiment is substantially the same as that of the percussive tool H shown in FIG. 1. The difference in the second embodiment is that the special bit holder 65 is employed, particularly for use with a bit having keyways, and any further description is omitted in this regard.

Figure 9A:
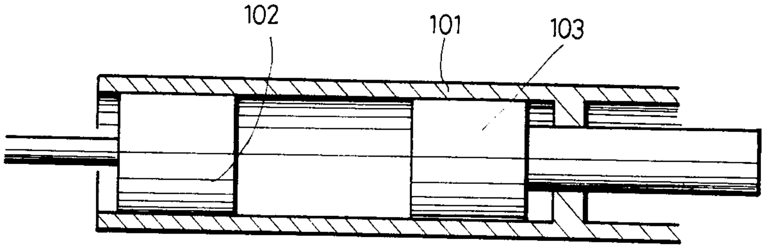
FIGS. 9A to 9C are schematic cross-sectional side views of different modification of the percussive mechanism.
Figure 9B:
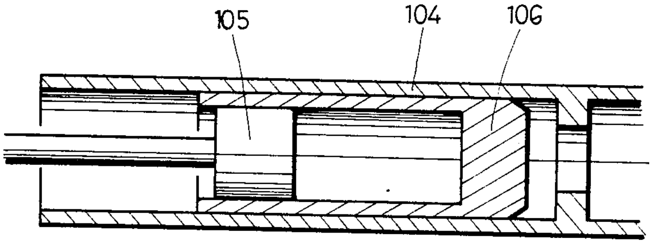
Figure 9C:
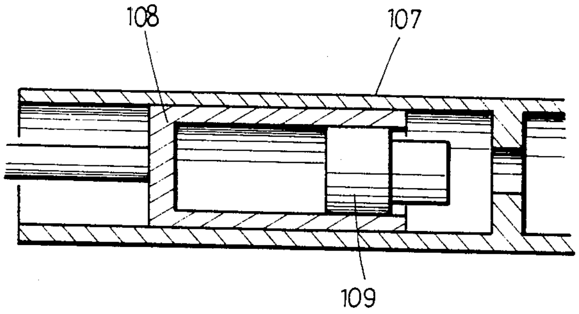

The mechanism for protecting the tool against idle blows shown in FIGS. 1 and 6 may be employed in various types of percussive mechanism. FIGS. 9A to 9C illustrate various modifications of such percussive mechanism, in which FIG. 9A shows a portion of a percussive tool of the type wherein a piston 102 and an integral ram 103 corresponding to the first and second rams of the foregoing embodiments are slidably mounted within a cylinder 101; FIG. 9B shows a portion of a percussive tool of the type wherein a cylindrical ram 106 having a closed end is slidably mounted within a cylinder 104, the ram 106 having a piston 105 slidably received therein; and FIG. 9C shows a portion of a percussive tool of the type wherein a cylindrical piston 108 having a closed end is slidably mounted within a cylinder 107, the piston 108 having a ram 109 slidably received therein.

While the invention has been described with reference to preferred embodiments thereof, it is to be understood that modifications or variations may be easily made without departing from the spirit of this invention which is defined by the appended claims.

What is claimed is:

1. A percussive tool comprising:

a crank housing;

crank means encased in said crank housing;

a substantially cylindrical barrel disposed generally forwardly of said crank means;

a cylinder positioned within and axially displaceable through said barrel;

a substantially cylindrical head secured to the forward end of said barrel;

a tool bit reciprocable through and extending outwardly from said head;

a piston operatively connected to said crank means and mounted within and axially displaceable through the rearward end of said cylinder;

ram means mounted within said cylinder and axially displaceable in front of said piston for imparting percussive action to said tool bit positioned in its operating position;

a front and a rear air chamber formed in front of and behind said ram means for maintaining an air cushion to drive said ram means;

a spring positioned between said barrel and said cylinder for normally urging the latter in the direction of rearward movement of said piston; and a pair of diametrically opposed exhaust openings formed in said cylinder;

the arrangement being such that when said cylinder is in its retracted position, said exhaust openings communicate with said front air chamber so that the air cushion therein is vented during forward movement of said ram means, and when said cylinder is in its advanced position, said exhaust openings are closed to seal said front air chamber so that said ram means is limited in its rearward movements.

2. The percussive tool as defined in claim 1 wherein said ram means comprises a first ram positioned in front of said piston and a second ram interposed between said first ram and said tool bit for transmitting the reciprocating movement of said first ram to said tool bit.

3. The percussive tool as defined in claim 2 wherein said cylinder has a pair of diametrically opposed keys retained therein and said second ram has a pair of keyways formed thereon for receiving said keys, respectively, said keys each having on its outer end surface a protective member for protecting the inner periphery of said barrel, said protective member being adapted to contact the inner periphery of said barrel.

4. The percussive tool as defined in claim 1 further comprising a cover member formed of resilient material enclosing said barrel and said head, a locking plate pivotally mounted to the forward end of said head for locking said tool bit in its operating position, said cover member having a buffer projection integrally formed on the forward end thereof for protecting said locking plate, said buffer projection extending circumferentially outwardly in confronting relation to the outer periphery of said locking plate.

5. The percussive tool as defined in claim 4 wherein said tool bit has a hexagonal cross-sectional flange portion formed thereon, said head having a complimentary hexagonal cross-sectional bore for slidably but non-rotatably receiving said flange portion of said tool bit, said locking plate having a profiled opening comprising a first opening through which said flange portion of said tool bit is non-insertable and a second opening through which said flange portion of said tool bit is insertable.

* * * * *